(12) United States Patent
Arimitsu

(10) Patent No.: US 8,965,577 B2
(45) Date of Patent: Feb. 24, 2015

(54) FORCE SENSOR AND INDUSTRIAL ROBOT INCLUDING THE SAME

(75) Inventor: Yasumichi Arimitsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 12/786,828

(22) Filed: May 25, 2010

(65) Prior Publication Data

US 2010/0312394 A1 Dec. 9, 2010

(30) Foreign Application Priority Data

Jun. 3, 2009 (JP) .................. 2009-134187

(51) Int. Cl.
*G01L 1/00* (2006.01)
*G01L 5/16* (2006.01)
*G01B 11/16* (2006.01)
*G01B 9/02* (2006.01)

(52) U.S. Cl.
CPC .............. *G01L 5/166* (2013.01); *G01B 2290/45* (2013.01); *G01B 2290/30* (2013.11); *G01B 9/02097* (2013.01); *G01B 11/16* (2013.01)
USPC .............................. 700/258; 700/260; 702/41

(58) Field of Classification Search
CPC ...... G01B 11/08; G01B 11/10; G01B 11/105; G01B 11/12; G01B 11/14; G01B 11/16; G01B 11/161; G01B 11/164; G01B 11/165; G01B 11/167; G01B 11/168; G01B 2290/30; G01B 11/45; G01B 9/02097; G01L 5/166

USPC ............... 700/260; 250/208.1, 208.2, 227.19, 250/237 R, 237 G, 239, 578.1; 702/41, 159
See application file for complete search history.

(56) References Cited

U.S. PATENT DOCUMENTS

| | | | | |
|---|---|---|---|---|
| 2004/0232318 | A1* | 11/2004 | Kitamura et al. | 250/221 |
| 2005/0185196 | A1* | 8/2005 | Kitamura et al. | 356/614 |
| 2006/0283338 | A1* | 12/2006 | Degertekin | 99/486 |

FOREIGN PATENT DOCUMENTS

| | | |
|---|---|---|
| JP | 60-131191 A | 7/1985 |
| JP | 10-274573 A | 10/1998 |
| JP | 2003-227735 A | 8/2003 |
| JP | 2005-098964 A | 4/2005 |
| JP | 2005-241353 A | 9/2005 |
| JP | 2005241353 A | 9/2005 |

* cited by examiner

*Primary Examiner* — Jerrah Edwards
(74) *Attorney, Agent, or Firm* — Canon USA, Inc., IP Division

(57) ABSTRACT

A force sensor includes a base unit, an elastic supporting unit, an action unit supported by the elastic supporting unit, and a detection unit that detects at least one of an external force acting on the action unit and a moment acting on the action unit. The detection unit includes a light source, a diffraction grating, a photodetector array that receives an interference image formed by light that has been emitted from the light source and diffracted by the diffraction grating and outputs signals having different phases, and a calculation unit that calculates a displacement of the action unit with respect to the base unit on the basis of the signals and calculates at least one of the external force and the moment acting on the action unit on the basis of the displacement.

9 Claims, 16 Drawing Sheets

FORCE SENSOR AND INDUSTRIAL ROBOT INCLUDING THE SAME

BACKGROUND OF THE INVENTION

1. Field of the Invention

The present invention relates to a force sensor that includes a base unit, an elastic supporting unit connected to the base unit, and an action unit supported by the elastic supporting unit, and detects at least one of an external force acting on the action unit and a moment acting on the action unit. The present invention also relates to an industrial robot including the force sensor.

2. Description of the Related Art

Existing types of force sensors for detecting an external force include a strain gauge type (resistance type), a capacitance type, and an optical type. Among the three types, the strain gauge type (Japanese Patent Laid-Open No. 10-274573) is most commonly used.

Examples of existing optical type image sensors include an optical sensor using a technique of tracking control and focus control employed in information recording and reproduction apparatuses such as optical disc drives (Japanese Patent Laid-Open No. 2005-241353) and an optical sensor using a light source and a four-element photodiode (PD) (Japanese Patent Laid-Open No. 2005-98964).

Main uses of a force sensor include that for an arm or a finger of an industrial robot. Because higher precision has been required for an operation performed by an industrial robot, a force sensor capable of detecting a force with higher precision and higher sensitivity has been needed. Moreover, because the arm and the finger of the robot have to move rapidly, control with a higher bandwidth is necessary. Although a higher rigidity is required for the force sensor in this case, in general, the detection sensitivity of a force sensor decreases when the rigidity is increased.

However, it is difficult to obtain both a high rigidity and a high detection sensitivity with the force sensors described in Japanese Patent Laid-Open Nos. 10-274573, 2005-241353, and 2005-98964, because the resolution of a displacement sensor, which detects a displacement that is required to calculate an external force and the like, is low and the detection sensitivity of the displacement sensor is insufficient.

SUMMARY OF THE INVENTION

The present invention, which has been achieved in view of such a situation, provides a force sensor having a high rigidity and a high detection sensitivity, and an industrial robot including the force sensor.

According to a first aspect of the present invention, a force sensor includes a base unit; an elastic supporting unit connected to the base unit; an action unit supported by the elastic supporting unit; and a detection unit that detects at least one of an external force acting on the action unit and a moment acting on the action unit, wherein the detection unit includes a light source, a diffraction grating, a photodetector array that receives an interference image formed by light that has been emitted from the light source and diffracted by the diffraction grating and outputs a plurality of signals having different phases, and a calculation unit that calculates a displacement of the action unit with respect to the base unit on the basis of the plurality of signals and calculates at least one of the external force and the moment acting on the action unit on the basis of the displacement.

In the force sensor, the diffraction grating may include a plurality of diffraction gratings having different grating directions, the photodetector array may include a plurality of photodetector arrays that receive the interference image formed by light that has been diffracted by the plurality of diffraction gratings, and the calculation unit may calculate displacements of the action unit in a plurality of directions with respect to the base unit and calculates at least one of a plurality of external forces and a plurality of moments on the basis of the displacements in the plurality of directions.

In the force sensor, the light source may include a plurality of light sources, and the number of light sources may be smaller than the number of the photodetector arrays.

In the force sensor, the calculation unit may calculate a displacement of the action unit in a direction perpendicular to a plane in which the photodetector array is disposed on the basis of a change in an amount of light received by the photodetector array, the change being caused by a movement of the action unit in the perpendicular direction, and may calculate the external force acting on the action unit in the perpendicular direction on the basis of the displacement in the perpendicular direction.

In the force sensor, the calculation unit may calculate the displacement of the action unit in a direction perpendicular to a plane in which the photodetector array is disposed on the basis of a change in a contrast of the interference image caused by a movement of the action unit in the perpendicular direction, and may calculate the external force acting on the action unit in the perpendicular direction on the basis of the displacement in the perpendicular direction.

According to a second aspect of the present invention, an industrial robot includes the force sensor according the first aspect of the present invention; a driven unit disposed in the action unit; a drive unit that drives the driven unit; and a control unit that controls driving of the drive unit on the basis of at least one of an external force and a moment detected by the force sensor.

With the force sensor according to the first aspect of the present invention, a displacement of the action unit is calculated according to a sine-wave (cosine wave) signal whose phase changes in accordance with the displacement and which is output from the photodetector array, so that detection can be performed with a higher sensitivity. Therefore, a sufficiently high detection sensitivity can be obtained without sacrificing the rigidity, whereby both a high rigidity and a high sensitivity can be obtained.

Further features of the present invention will become apparent from the following description of exemplary embodiments with reference to the attached drawings.

DESCRIPTION OF THE EMBODIMENTS

Hereinafter, embodiments of the present invention will be described with reference to the drawings.

First Embodiment

Referring to FIGS. 1A to 10, a first embodiment according to the present invention will be described. The coordinate system (x, y, and z axes) are common to all drawings.

Figure 1A:
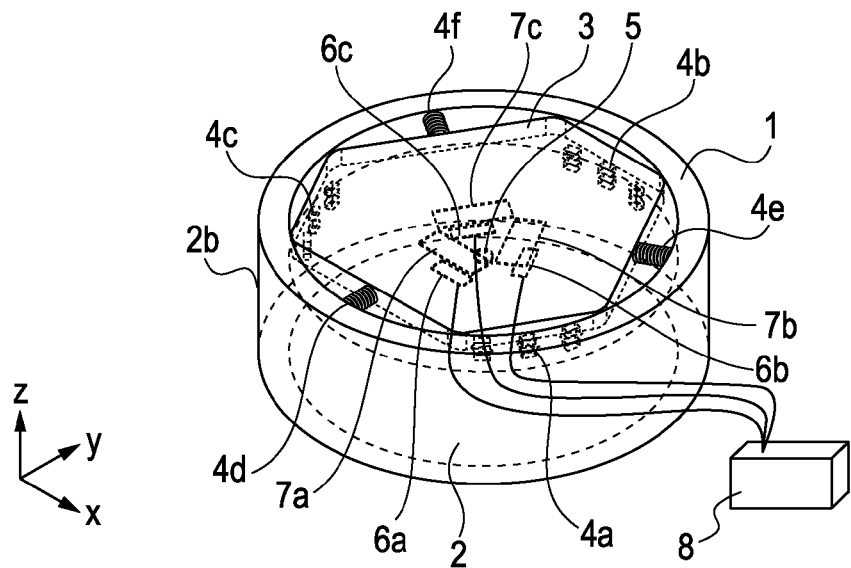
FIGS. 1A to 1E are schematic views of a force sensor according to a first embodiment of the present invention.

FIG. 1A is a schematic perspective view of an optical force sensor according to a first embodiment of the present invention. A force sensor 1 according to the first embodiment includes a base unit 2, an action unit 3 that is movable relative to the base unit 2, elastic supporting units 4a to 4f connecting the action unit 3 to the base unit 2, and a detection unit that detects at least one of an external force and a moment acting on the action unit 3. The base unit 2 includes a bottom base portion 2a and a side base portion 2b.

The detection unit includes a light source 5, three photodetector arrays (photodiode arrays: PD) 6a to 6c, three diffraction gratings (displacement scales) 7a to 7c, and the calculation unit 8. The light source 5 and the three photodetector arrays 6a to 6c are disposed in the base unit 2 in the same plane (xy plane) perpendicular to the z axis. The three diffraction gratings 7a to 7c are disposed on the action unit 3 in a plane perpendicular to the z axis and facing the light source 5 and the three photodetector arrays 6a to 6c. In the first embodiment, the three photodetector arrays 6a to 6c are arranged on the circumference of a circle centered on the light source 5 at an angle of 120 degrees to each other.

Figure 1B:
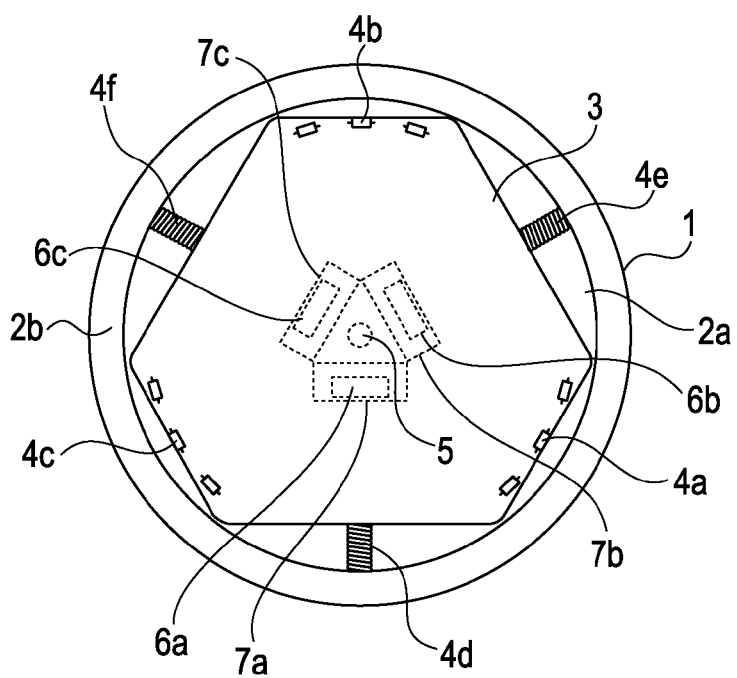
Figure 1C:
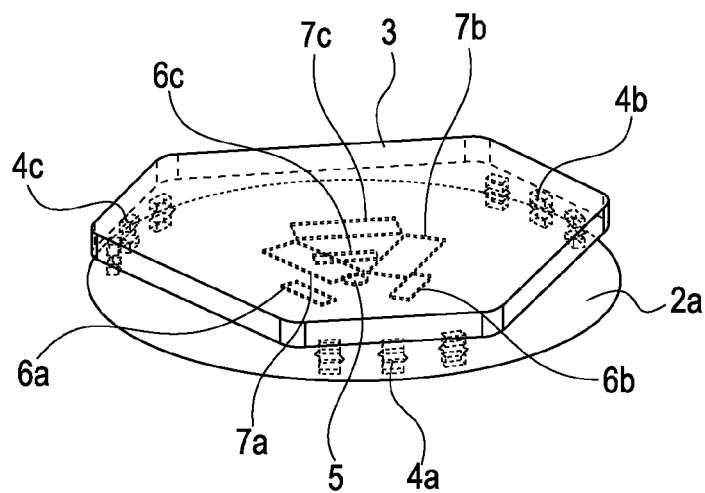
Figure 1D:
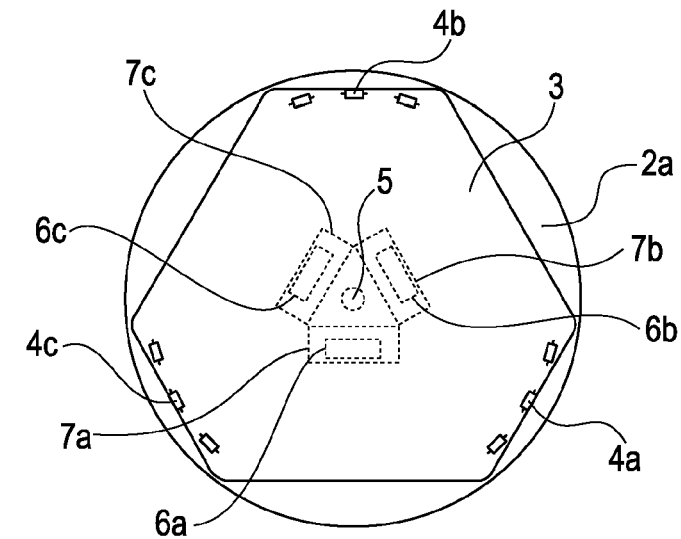
Figure 1E:
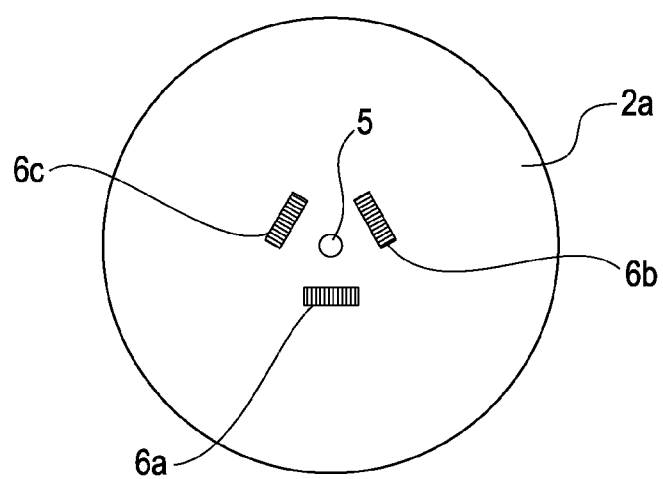

FIG. 1B is a schematic plan view of FIG. 1A. FIG. 1C is a schematic perspective view of FIG. 1A from which the side base portion 2b, the elastic supporting units 4d to 4f, and the calculation unit 8 are removed. FIG. 1D is a schematic plan view of FIG. 1C. FIG. 1E is a schematic plan view of FIG. 1C from which the action unit 3, the elastic supporting units 4a to 4c, and the calculation unit 8 are removed. Among the elastic supporting units 4a to 4f illustrated in FIG. 1, the elastic supporting units 4a to 4c are elastic members capable of elastically deforming along the x, y, and Z axes of the xyz coordinate system of FIG. 1, and the elastic supporting units 4d to 4f are shaped like a coil spring. The structure of the elastic supporting units 4a to 4f may be appropriately selected from a variety of structures in accordance with the mechanical property (such as the rigidity) required for the elastic supporting units.

The calculation unit 8 calculates, on the basis of the signals output from the three photodetector arrays 6a to 6c, the displacement of the action unit 3 in the grating direction of the diffraction gratings 7a to 7c or the displacement of the action unit 3 in a direction perpendicular to the surface in which the diffraction gratings are formed. The calculation unit 8 calculates at least one of an external force and a moment acting on the action unit on the basis of the displacement that has been calculated.

Next, a method of how the detection unit detects the displacement of the action unit will be described. First, a method of detecting the displacement in the grating direction of the diffraction grating will be described.

Figure 2A:
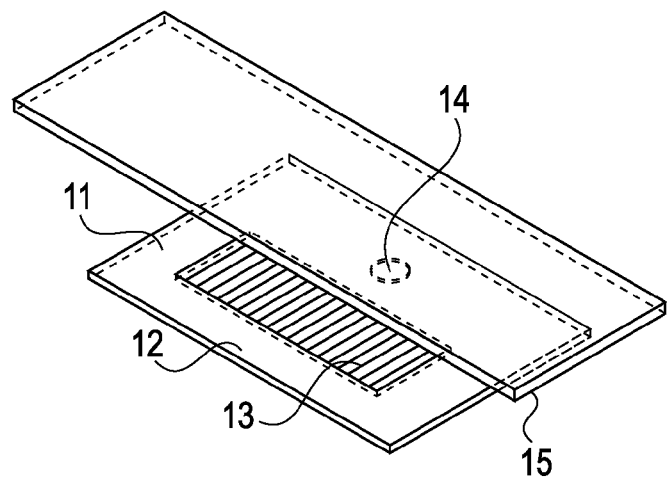
FIGS. 2A to 2C are schematic views illustrating the basic structure of a displacement sensor including one light source, one photodetector array, and one reflective diffraction grating.
Figure 2B:
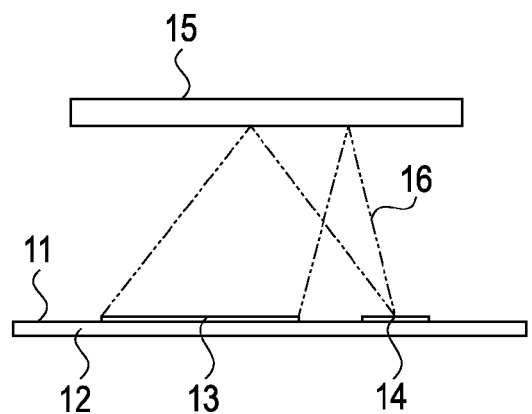

FIGS. 2A and 2B illustrate a displacement sensor 11 including a light source 14, a photodetector array 13, and a diffraction grating 15, which respectively correspond to the light source, one of the photodetector arrays, and one of the diffraction gratings illustrated in FIG. 1. FIG. 2A is a schematic perspective view of the displacement sensor 11 including the light source 14, the photodetector array 13, and the diffraction grating 15. FIG. 2B is a schematic right side view of FIG. 2A.

The light source 14 emits light from the emission center thereof, which can be regarded as a point light source, and directly irradiates the diffraction grating 15 with the light. The light emitted from the light source 14 is reflected by the diffraction grating 15, and the Fourier image (diffracted interference image) of the reflected diffracted light is received by the photodetector array 13. Because the light source 14 and the photodetector array 13 are disposed in the same plane and the diffraction grating 15 is of a reflection type, the spatial period of the light and shade of the Fourier image observed by the photodetector array 13 is twice the arrangement pitch of the diffraction grating 15. Therefore, for example, by setting the arrangement pitch of the photodetector array 13 to be twice the arrangement pitch of the diffraction grating 15, the amplitude of the output signal can be maximized by using the photodetector array 13. If, for example, the photodetector array 13 has a predetermined regular arrangement pitch, a plurality of signals having different phases can be obtained by obtaining signals of photodetectors that are spatially separated from each other.

Figure 2C:
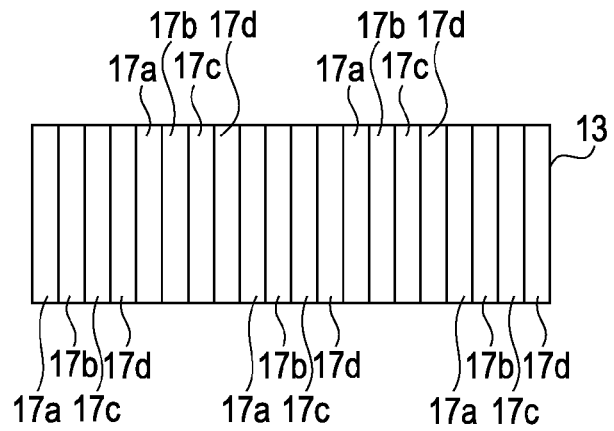

FIG. 2C is an enlarged schematic plan view of the photodetector array 13 illustrated in FIG. 2A. The photodetector array 13 includes five sets of four photodetectors 17a to 17d that are adjacent to each other. A signal is output using all of five identical photodetectors that are spatially separated from each other. In FIG. 2A, when the reflective diffraction grating 15 moves relative to the photodetector array 13, the Fourier image of the reflective diffraction grating 15 moves over the photodetector array 13 in the direction in which the photodetectors are arranged. When the Fourier image moves over the photodectors 17a, 17b, 17c, to 17d in this order, signals obtained from the photodetectors 17b, 17c, and 17d respectively have phase differences of 90, 180, and 270 degrees relative to a signal obtained from the photodetector 17a. In this case, a maximum of four signals having different phases can be obtained. On the basis of the principle described above, the photodetector array 13, which includes photodiodes that are linearly arranged, can output a plurality of signals 21 to 24 having phase differences illustrated in FIGS. 3 and 4.

Figure 3:
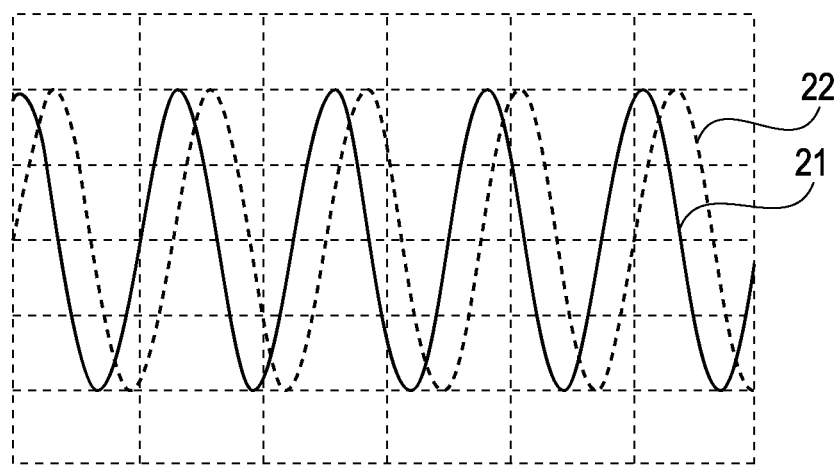
FIG. 3 is a graph illustrating a first analog signal and a second analog signal.

FIG. 3 illustrates examples of analog signals output from the displacement sensor 11 illustrated in FIG. 2. FIG. 3 illustrates a first analog signal 21 and a second analog signal 22 having a phase difference of 90 degrees relative to the first analog signal 21. Because the first and second analog signals 21 and 22 can be approximated with a sine wave and a cosine wave, the phase of a signal for one period can be accurately calculated (interpolated), for example, by using a method such as calculating the arctangent of the values of the two signals. The displacement of the reflective diffraction grating 15 relative to the photodetector array 13 can be calculated using the phases of the signals that have been calculated and the wave number of the first or second analog signal that has been counted. By setting the phase difference between the signals at a value of, for example, 90 degrees, which is different from 180 degrees, the amount of displacement at each of the photodetector arrays can be obtained as a signed value. By providing an origin detection function using an origin mark and an origin mark detection unit, the absolute position can be detected.

Figure 4:
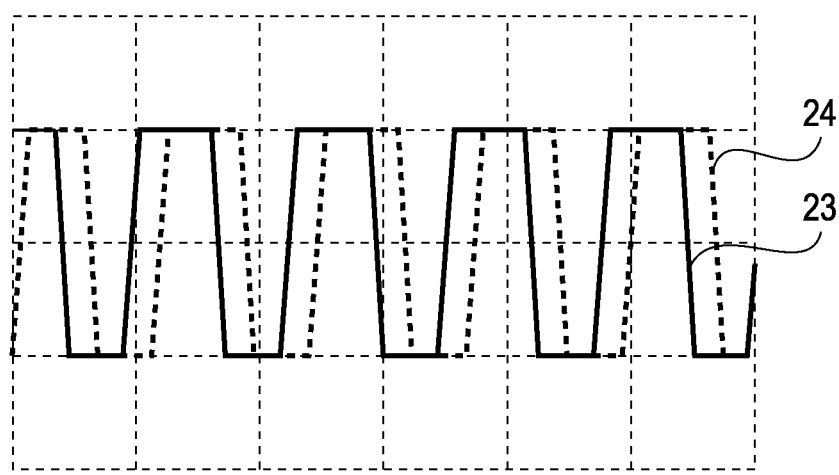
FIG. 4 is a graph illustrating a first digital signal and a second digital signal.

FIG. 4 illustrates examples of digital signals output from the displacement sensor 11 illustrated in FIG. 2. FIG. 4 illustrates a first digital signal 23 and a second digital signal 24 obtained by digitizing the analog signals illustrated in FIG. 3 using a certain threshold. When counting the wave number of the aforementioned signal, the digital signal is to be used.

By decreasing the grating pitch of the diffraction grating and the arrangement pitch of the photodetector array, the resolution can be increased and the displacement can be detected more precisely.

Next, a method of detecting the displacement in a direction perpendicular to the plane in which the diffraction grating is disposed will be described.

A first method detects a change in the amount of light per unit current flowing to the light source 5. This method includes two methods depending on whether an auto power control (APC) drive is activated or not. The APC drive controls the electric current consumed by the light source so as to keep the total amount of light received by the photodetector array to be constant irrespective of the change in the distance (gap) between the photodetector array and the diffraction grating.

Figure 5:
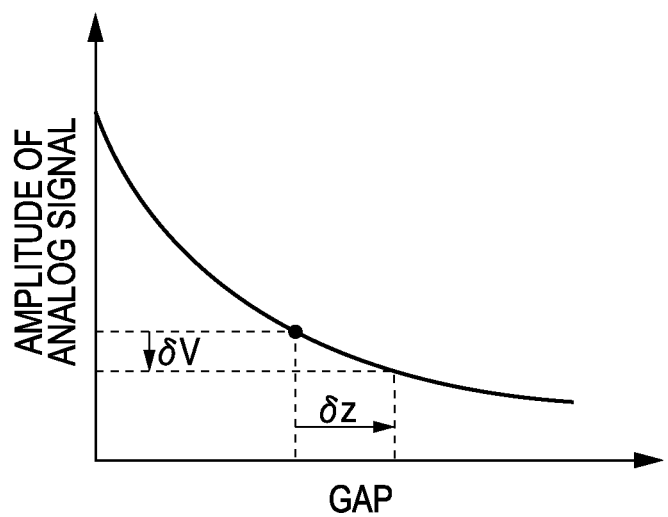
FIG. 5 is a graph illustrating the relationship between the distance (gap) between the photodetector array and the diffraction grating and the amplitude of the analog signal.
Figure 6:
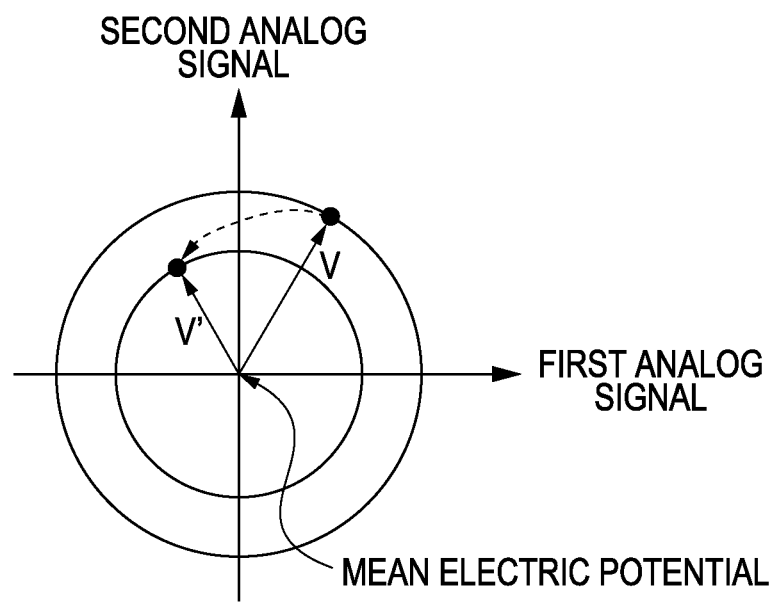
FIG. 6 is a diagram illustrating an example of the Lissajous curve when the amplitude of the first analog signal or the second analog signal changes from V to V'.

When the APC drive is not activated, the amplitude of the analog signals 21 and 22, which is illustrated in FIG. 3, monotonically decreases as the gap increases as illustrated in FIG. 5. By detecting a change $\delta V$ in the amplitude of the analog signal, a displacement $\delta z$ (change in the gap) of the diffraction grating along the z axis can be detected. An analog amplitude can be detected, for example, by using a Lissajous curve. When the first analog signal 21 and the second analog signal 22 illustrated in FIG. 6 have a phase difference of 90 degrees, a Lissajous curve illustrated in FIG. 6 can be obtained from the two signals 21 and 22. Because the radius of the Lissajous curve represents the amplitude of the signal, the amplitude can be obtained by detecting a change in the radius (the change from V to V' in FIG. 6).

Figure 7:
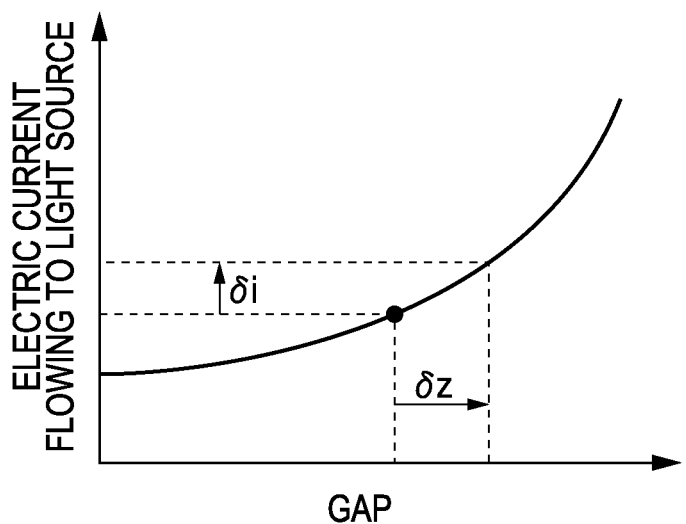
FIG. 7 is a graph illustrating the relationship between the distance (gap) between the photodetector array and the diffraction grating and the current value flowing to the light source.

When the APC drive is activated, the electric current flowing to the light source monotonically increases as the gap increases as illustrated in FIG. 7. By detecting the change $\delta i$ in the electric current, the displacement $\delta z$ (gap change) of the diffraction grating along the z axis can be detected.

Figure 8:
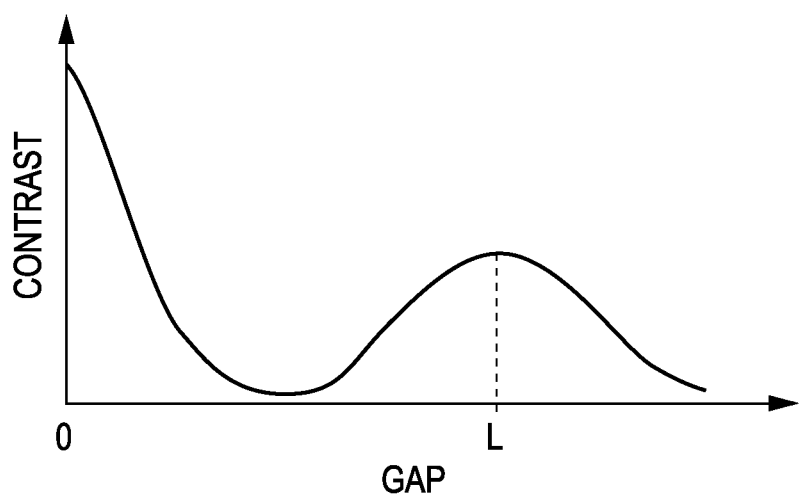
FIG. 8 is a graph illustrating the relationship between the distance (gap) between the photodetector array and the diffraction grating and the contrast of a Fourier image.

A second method uses the contrast of a Fourier image caused by three-beam interference under diverging light rays. In general, the amplitude of the analog signal output from the photodetector array 13 illustrated in FIG. 2 increases as the contrast of the Fourier image increases. The amplitude of the analog signal output from the photodetector array 13 illustrated in FIG. 2 decreases as the contrast of the Fourier image decreases. That is, there is a one-to-one correspondence between the amplitude of the analog signal and the contrast of the Fourier image, so that a change in the contrast of the Fourier image can be detected from a change in the amplitude of the analog signal. In general, the relationship between the gap and the contrast of the Fourier image under divergent light rays exhibits periodicity as illustrated in FIG. 8. In FIG. 8, a period L between the state in which the gap is zero to the state in which the contrast is maximal is given by the following equation.

$$L = \frac{2 \cdot P^2}{\lambda} \quad (1)$$

In equation (1), P is the pitch of the diffraction grating, and $\lambda$ is the wavelength of the light source.

Figure 9:
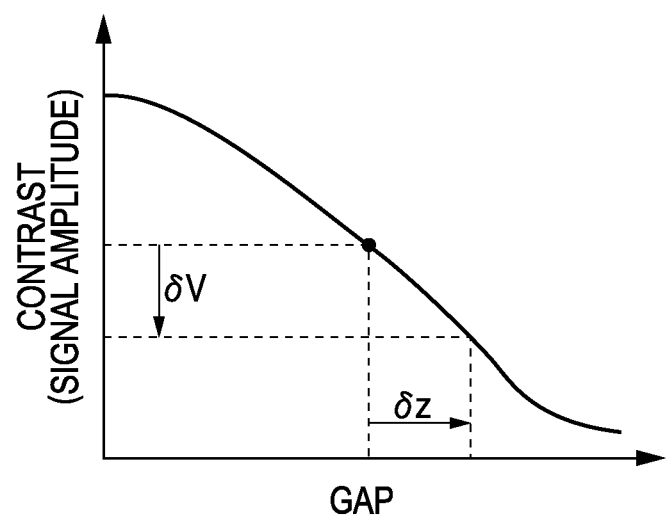
FIG. 9 is an graph illustrating, in an enlarged manner, a region in which the contrast of a Fourier image monotonically decreases with increasing gap between the photodetector array and the diffraction grating.

When the APC drive of the displacement sensor is activated, the signal amplitude simultaneously decreases if the contrast of the Fourier image is decreased by changing the distance (gap) between the photodetector arrays 6a to 6c and the reflective diffraction gratings 7a to 7c. That is, the one-to-one correspondence between the contrast of the Fourier image and the signal amplitude is used. As illustrated in FIG. 9, by detecting the change $\delta V$ in the amplitude of the analog signal in a region in which the contrast (signal amplitude) of the Fourier image monotonically decreases as the gap (distance) increases, the displacement $\delta z$ from a reference point along the z axis can be detected.

Next, a method of calculating an external force and a moment acting on the action unit using the displacement, which has been detected by using the aforementioned method of detecting the displacement of the action unit, will be described.

Figure 10:
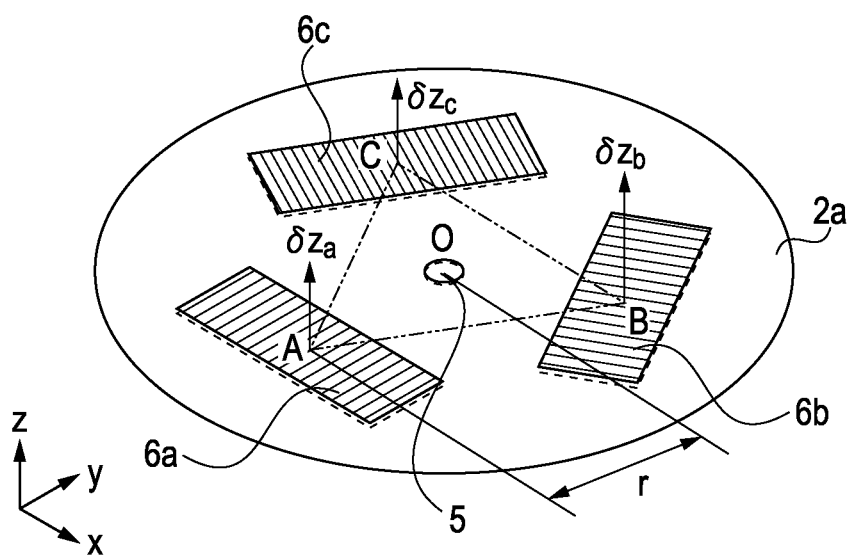
FIG. 10 is a schematic perspective view of FIG. 1E.

When the force sensor according to the first embodiment includes the light source 5 and three or more photodetector arrays 6a to 6c having different arrangement directions, a six-axis external force and moment can be detected on the basis of the following calculation method. Referring to FIG. 10, which is a schematic perspective view of FIG. 1E, the calculation method will be described. In FIG. 10, an xyz orthogonal coordinate system having an origin at the barycenter O of the light source is used. The positions of the barycenters of the three photodetector arrays 6a, 6b, and 6c are respectively denoted by A, B, and C. A case when $\angle AOB = \angle BOC = \angle COA = 120°$ and $OA = OB = OC = r$ will be considered. Displacements detected by the photodetector arrays 6a, 6b, and 6c are respectively denoted by $s_a$, $s_b$, and $s_c$. Displacements along the z axis at the positions A, B, and C are respectively denoted by $\delta z_a$, $\delta z_b$, and $\delta z_c$. Displacements of the entire action unit along the x, y, and z axes are respectively denoted by $\Delta x$, $\Delta y$, and $\Delta z$. Rotation angles of the entire action unit around the x, y, and z axes centered at the origin O are respectively denoted by $\theta_x$, $\theta_y$, and $\theta_z$.

$\Delta x$, $\Delta y$, and $\theta_z$ are expressed by the following equations using displacements $s_a$, $s_b$, and $s_c$ detected in the xy plane and obtained from the three photodetector arrays 6a, 6b, and 6c.

$$\Delta x = \frac{1}{3}\left(s_a - \frac{s_b}{2} - \frac{s_c}{2}\right) \quad (2)$$

$$\Delta y = \frac{\sqrt{3}}{4}(s_b - s_c) \quad (3)$$

$$\theta_z = \frac{1}{3 \cdot r}(s_a + s_b + s_c) \quad (4)$$

$\Delta z$, $\theta_x$, and $\theta_y$ are expressed by the following equations using displacements $\delta z_a$, $\delta z_b$, and $\delta z_c$ along the z axis obtained from the three photodetector arrays 6a, 6b, and 6c.

$$\Delta z = \frac{1}{3}(\delta z_a + \delta z_b + \delta z_c) \quad (5)$$

$$\theta_x = \tan^{-1}\left\{\frac{\delta z_a - \frac{1}{2}(\delta z_b + \delta z_c)}{\frac{3}{2} \cdot r}\right\} \quad (6)$$

$$\theta_y = \tan^{-1}\left(\frac{\delta z_b - \delta z_c}{\sqrt{3} \cdot r}\right) \quad (7)$$

In order to enable the force sensor according to the first embodiment to detect the six-axis external force and moment, it is necessary to independently detect the displacements $\delta z_a$, $\delta z_b$, and $\delta z_c$ at the positions A, B, and C. Therefore, when the first method, which employs a change in the amount of light normalized by the electric current flowing to the light source, is used in order to detect a displacement of the photodetector array in the vertical direction, the following point is to be noted. When the APC drive is activated and a method of detecting the change $\delta i$ in the electric current flowing to the light sources is used, it is necessary to provide three light sources corresponding to the three photodetector arrays 6a, 6b, and 6c.

On the basis of six-axis displacements $\Delta x$, $\Delta y$, $\Delta z$, $\theta_x$, $\theta_y$, and $\theta_z$, external forces $F_x$, $F_y$, and $F_z$ acting along the x, y, and z axes and moments $M_x$, $M_y$, and $M_z$ around the x, y, and z axes are calculated, for example, as follows.

$$F_x = K_x \cdot \Delta x \quad (8)$$

$$F_y = K_y \cdot \Delta y \quad (9)$$

$$F_z = K_z \cdot \Delta z \quad (10)$$

$$M_x = G_x \cdot \theta_x \cdot I_{px} \quad (11)$$

$$M_y = G_y \cdot \theta_y \cdot I_{py} \quad (12)$$

$$M_z = G_z \cdot \theta_z \cdot I_{pz} \quad (13)$$

In the above equations, $K_x$, $K_y$, and $K_z$ are the spring constants for the corresponding axes; $G_x$, $G_y$, and $G_z$ are shear moduli for the corresponding axes; and $I_{px}$, $I_{py}$, and $I_{pz}$ are the polar moments of inertia for the corresponding axes. The method of calculating an external force and a moment described here is exemplary. This calculation method can be used when Hooke's law holds between the external forces and the displacements along the axes and the twists $\theta_x$, $\theta_y$, $\theta_z$ around the x, y, and z axes can be regarded as specific angles of twist around the x, y, and z axes centered at the origin O.

By thus obtaining or calculating the constants such as the spring constants, the shear moduli, and the polar moments of inertia with respect to the axes beforehand, the external force acting along the axes and the moment around the axes can be calculated using these constants and the displacements along the axes that have been calculated.

As described above, the force sensor according to the first embodiment precisely calculates a displacement of the action unit by interpolation using the same principle as an optical encoder. On the basis of the displacement, the force sensor calculates at least one of an external force and a moment acting on the action unit. Therefore, even if the force sensor has a high rigidity, the force sensor can detect the external force and the moment with a higher sensitivity. Moreover, using the same principle as an optical encoder, the force sensor can perform detection stably without being disturbed by, for example, variation in the wavelength of light emitted from the light source.

The force sensor according to the first embodiment includes a plurality of photodetector arrays and a plurality of diffraction gratings each arranged in a plane. Moreover, the photodetector arrays and the diffraction gratings may be formed as flat members. Therefore, the thickness of the force sensor can be reduced.

A force sensor of the strain gauge type, which is described in Japanese Patent Laid-Open No. 10-274573, is usually manufactured by manually attaching a large number of strain gauges. Reduction in the size of such a force sensor is limited because of the manual attachment of the strain gauges. Therefore, it is difficult to use the force sensor together with a robot finger or the like that performs a precision work. Moreover, it is also difficult to perform a wiring operation after a large number of strain gauges have been attached, and the number of production steps and the production cost increase. Furthermore, because a large number of strain gauges are attached, a complex calibrator is to be included in the force sensor, which is also a problem.

In contrast to the resistance-type sensor, the force sensor according to the present invention has a benefit in that the size and the production cost of the force sensor can be reduced because attaching of strain gauges and subsequent wiring are not necessary.

A force sensor using the same principle as an optical pickup, which is described in Japanese Patent Laid-Open No. 2005-241353, includes a focusing lens and a focus drive mechanism, which makes the reduction in the size of the displacement sensor and the alignment of the displacement sensor difficult. Therefore, it is difficult to use such a force sensor together with a robot finger that performs a precision work. Moreover, the force sensor includes a large number of components, which may lead to increase in the number of production steps and the production cost.

In contrast to the optical-type sensor using the same principle as an optical pickup, it is not necessary that the force sensor according to the present invention include a focusing lens and a focus drive mechanism. Therefore, the force sensor has a benefit in that the size and the production cost can be reduced.

In a force sensor using a method of detecting an in-plane displacement with respect to the optical axis with a four-element PD, which is described in Japanese Patent Laid-Open No. 2005-98964, the spot diameter of a light beam emitted from the light source is to be reduced so as to obtain a high sensitivity. However, as the spot diameter decreases, it becomes more difficult to align the center of the spot with the center of the PD.

In contrast, in the force sensor according to the present invention, it is not necessary to focus light emitted from the light source to a region as small as that of the optical-type sensor with the four-element PD to perform detection with the same level of sensitivity. Therefore, the force sensor according to the present invention can be more easily manufactured.

Second Embodiment

Figure 11A:
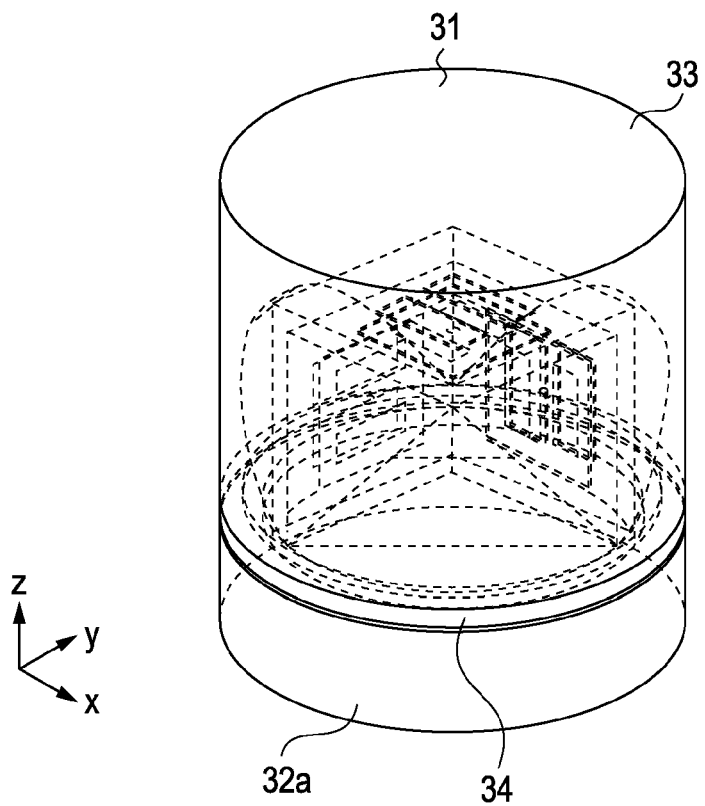
FIGS. 11A to 11F are schematic views of a force sensor according to a second embodiment of the present invention.
Figure 11B:
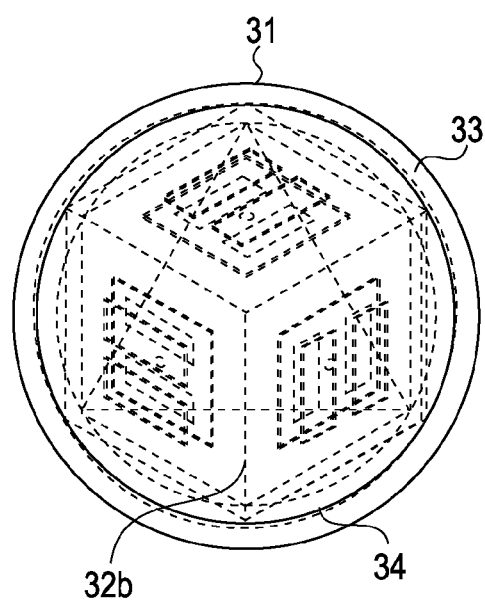
Figure 11C:
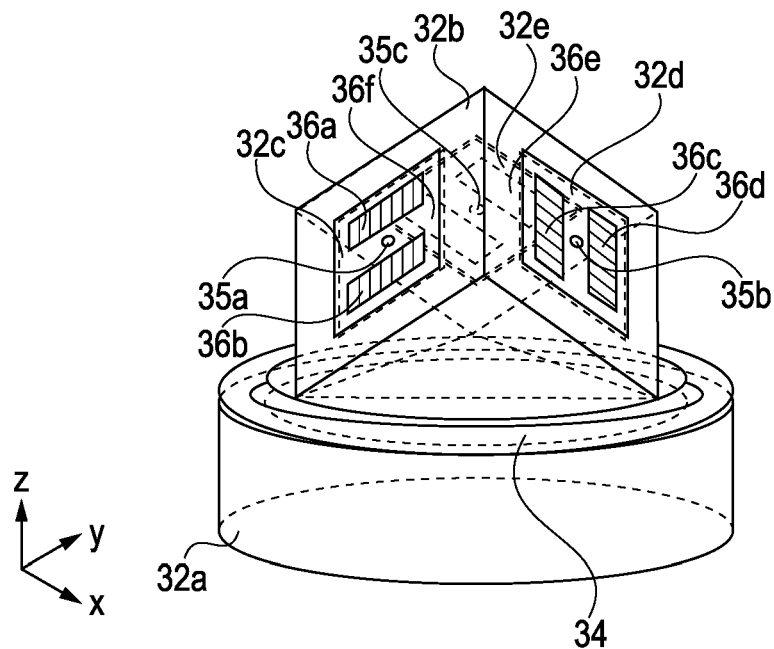
Figure 11D:
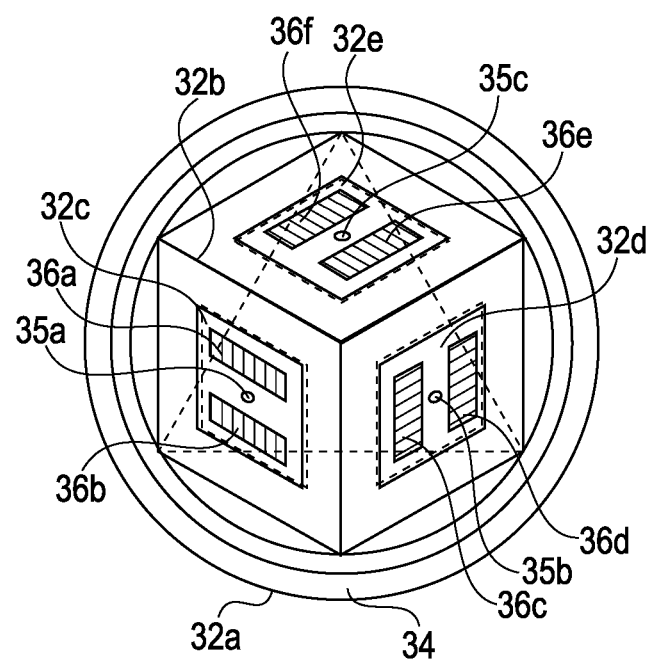
Figure 11E:
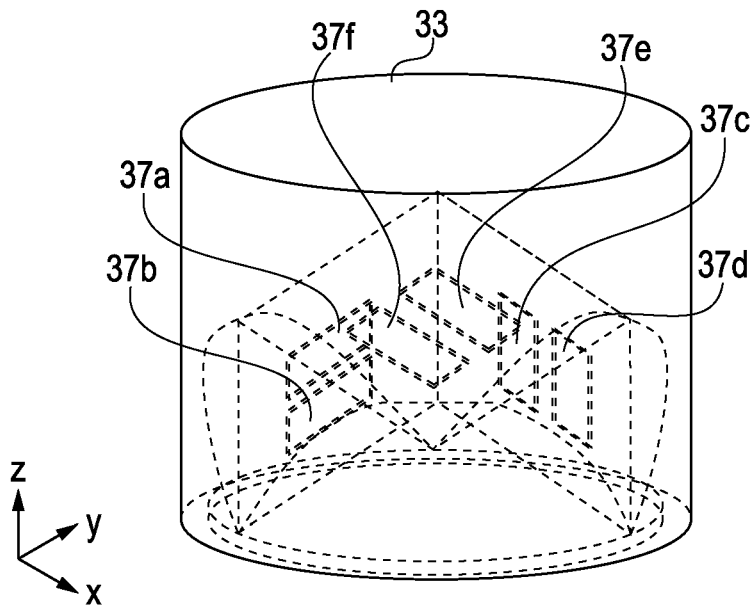
Figure 11F:
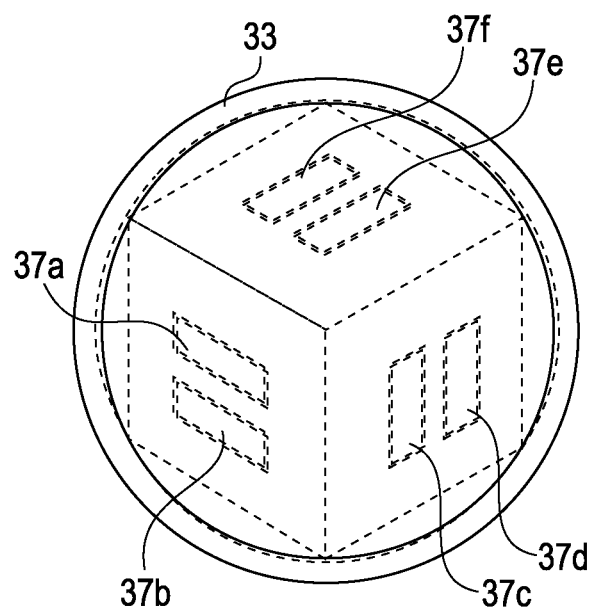
Figure 12:
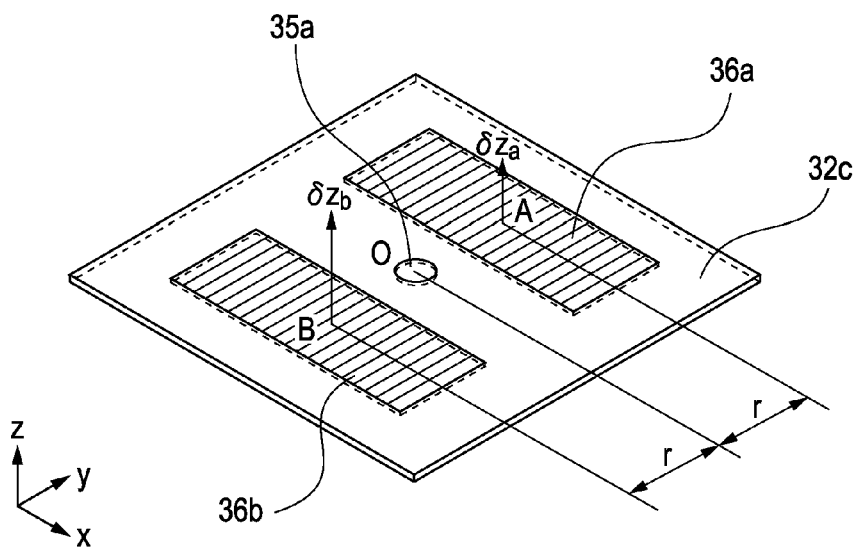
FIG. 12 is a schematic view illustrating the basic structure of a displacement sensor including one light source and two photodetector arrays.

Referring to FIGS. 11 and 12, a second embodiment of the present invention will be described. The differences between the second embodiment and the first embodiment will be mainly described, and description of the similarities will be omitted. The coordinate system (x, y, and z axes) are common to the drawings.

FIG. 11A is a schematic perspective view of an optical force sensor according to the second embodiment of the present invention. FIG. 11B is a schematic plan view of FIG. 11A. As illustrated in FIGS. 11A and 11B, an optical force sensor 31 according to the second embodiment includes a base unit 32 with a bottom base portion 32a and a side base portion 32b, an action unit 33, and an elastic supporting unit 34. The elastic supporting unit 34 illustrated in FIGS. 11A to 11D connects the base unit 32 to the action unit 33. The action unit 33 can be three-dimensionally displaced relative to the base unit 32. In the second embodiment, the elastic supporting unit 34 is a single member formed so as to surround light sources 35a to 35c and photodetector arrays 36a to 36f. As with the first embodiment, the second embodiment includes a calculation unit (not shown).

FIG. 11C is a schematic perspective view of FIG. 11A from which the action unit 33 including reflective diffraction gratings 37a to 37f is removed. FIG. 11D is a schematic plan view of FIG. 11C. FIGS. 11C and 11D illustrate the light sources 35a to 35c, the photodetector arrays 36a and 36b corresponding to the light source 35a, the photodetector arrays 36c and 36d corresponding to the light source 35b, and the photodetector arrays 36e and 36f corresponding to the light source 35c. In this case, emission points of the light sources 35a, 35b, and 35c are in the same plane as the photodetector arrays 36a and 36b, 36c and 36d, and 36e and 36f. Each of the three sets of the photodetector arrays 36a and 36b, 36c and 36d, and 36e and 36f corresponds to one of the light sources. However, three emission points may be formed in one light source by using a component such as an optical fiber. FIG. 11E is a schematic perspective view of the action unit 33 including the reflective diffraction gratings 37a to 37f. FIG. 11F is a schematic plan view of FIG. 11E.

Referring to elements of the displacement sensor illustrated in FIG. 12, a method of detecting the displacement of the action unit will be described.

In FIG. 12, an xyz orthogonal coordinate system having an origin at the barycenter O of the light source 35a is used. The positions of the barycenters of the two photodetector arrays 36a and 36b will be respectively denoted by A and B. The displacements detected by the photodetector arrays 36a and 36b will be respectively denoted by $s_a$ and $s_b$, the displacements of the entire action unit along x, y, and z axes will be respectively denoted by $\Delta x$, $\Delta y$, and $\Delta z$, and the rotation angles of the entire action unit around the x, y, and z axes centered at the origin will be respectively denoted by $\theta_x$, $\theta_y$, and $\theta_z$.

$\Delta x$ and $\theta_z$ are represented by the following equations using $s_a$ and $s_b$, which are the displacements detected by the two photodetector arrays 36a and 36b.

$$\Delta x = \frac{1}{2}(s_a + s_b) \quad (14)$$

$$\theta_z = \frac{1}{2 \cdot r}(-s_a + s_b) \quad (15)$$

Although only the method of calculating $\Delta x$ and $\theta_z$ has been described, $\Delta y$, $\theta_x$, $\Delta z$ and $\theta_y$ can be calculated in the same manner.

As described above, the second embodiment is an example of a six-axis force sensor including the displacement sensor illustrated in FIG. 12 (the reflective diffraction gratings 37a and 37b are not shown) disposed in each of three planes that are independent from each other (not parallel to each other). Because this method detects only the displacement in the grating direction of the diffraction grating, whereby detection sensitivities of the six axes $\Delta x$, $\Delta y$, $\Delta z$, $\theta_x$, $\theta_y$, and $\theta_z$ can be made substantially the same. The method of calculating the external force and the moment from the displacements output from the photodetector arrays is similar to that of the first embodiment.

By using the method of detecting the displacement perpendicular to the surface of the diffraction grating, which has been described regarding the first embodiment, $\Delta z$ and $\theta_x$ can be detected as follows. $\Delta z$ and $\theta_x$ are represented by the following equations using $\delta z_a$ and $\delta z_b$, which are respectively the displacements of the positions A and B of the barycenters of the photodetector arrays 36a and 36b.

$$\Delta z = \frac{1}{2}(\delta z_a + \delta z_b) \quad (16)$$

$$\theta_x = \tan^{-1}\left(\frac{-\delta z_a + \delta z_b}{2 \cdot r}\right) \quad (17)$$

By using the method described above, detection with respect to a maximum of four axes $\Delta x$, $\theta_z$, $\Delta z$, and $\theta_x$ can be performed using the structure illustrated in FIG. 12, which includes one light source and two photodetector arrays that are arranged parallel to each other.

The present invention is not limited to the embodiment illustrated in FIG. 11, and may be appropriately modified in accordance with the number of axes and the detection sensitivity that are needed.

As with the force sensor according to the first embodiment, the force sensor according to the second embodiment has advantages over those of Japanese Patent Laid-Open Nos. 10-274573, 2005-241353, and 2005-98964.

Third Embodiment

Referring to FIGS. 13A to 13H, a third embodiment of the present invention will be described. The differences between the third embodiment and the first and second embodiments will be mainly described, and description of the similarities will be omitted. The coordinate system (x, y, and z axes) are common to the drawing.

Figure 13A:
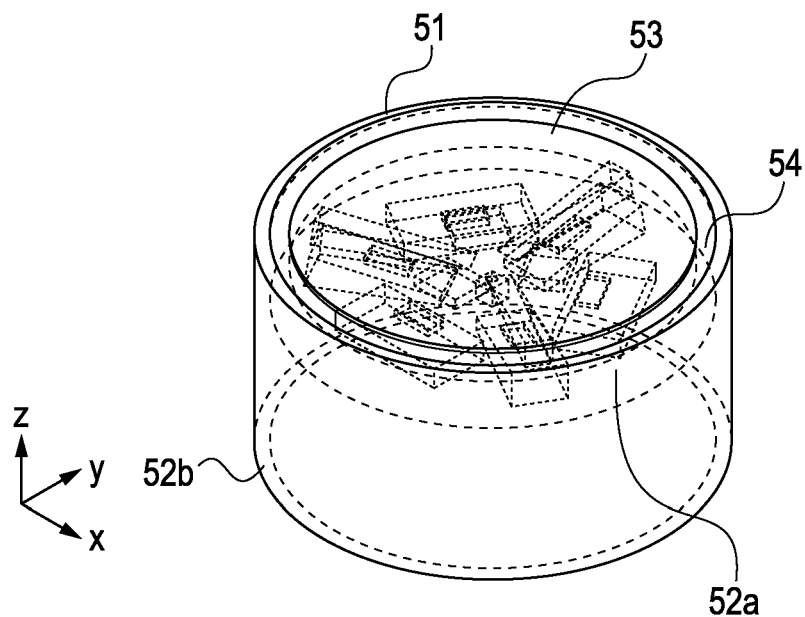
FIGS. 13A to 13H are schematic views of a force sensor according to a third embodiment of the present invention.
Figure 13B:
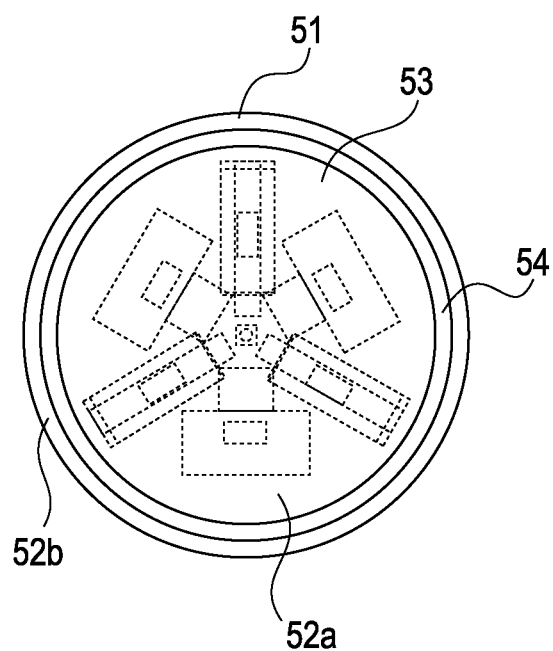

FIG. 13A is a schematic perspective view of an optical force sensor 51 according to the third embodiment of the present invention. FIG. 13B is a schematic plan view of FIG. 13A. As illustrated in FIGS. 13A and 13B, the optical force sensor 51 includes a base unit 52 with a bottom base portion 52a and a side base portion 52b, an action unit 53, and an elastic supporting unit 54. The elastic supporting unit 54 illustrated in FIGS. 13A and 13B connects the base unit 52 to the action unit 53. The action unit 53 can be three-dimensionally displaced relative to the base unit 52. In the third embodiment, the elastic supporting unit 54 is a single member formed so as to surround a light source 55 and photodetector arrays 56a to 56f. As with the first embodiment, the third embodiment includes a calculation unit (not shown).

Figure 13C:
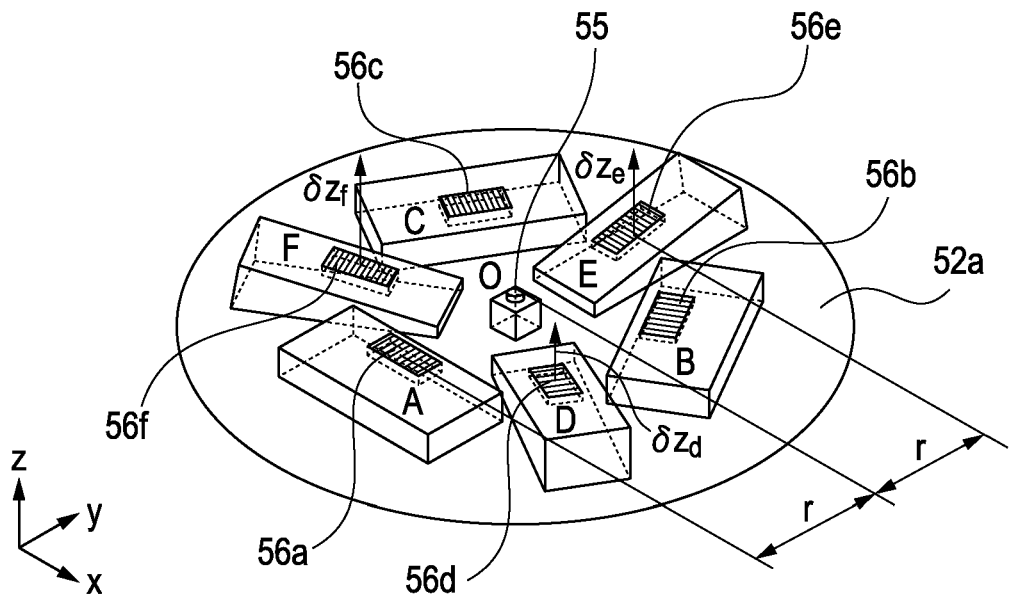
Figure 13D:
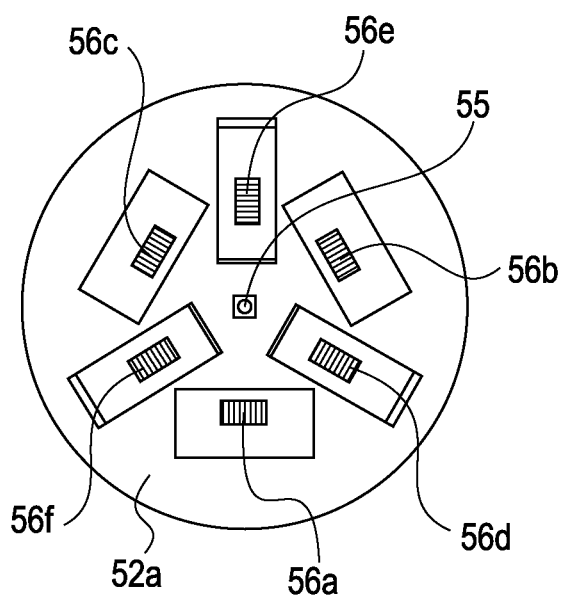
Figure 13E:
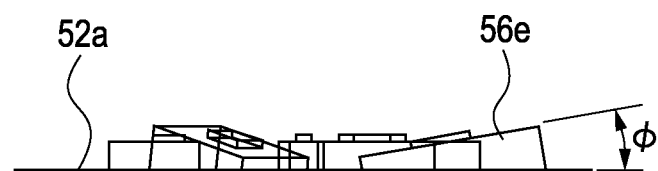
Figure 13F:
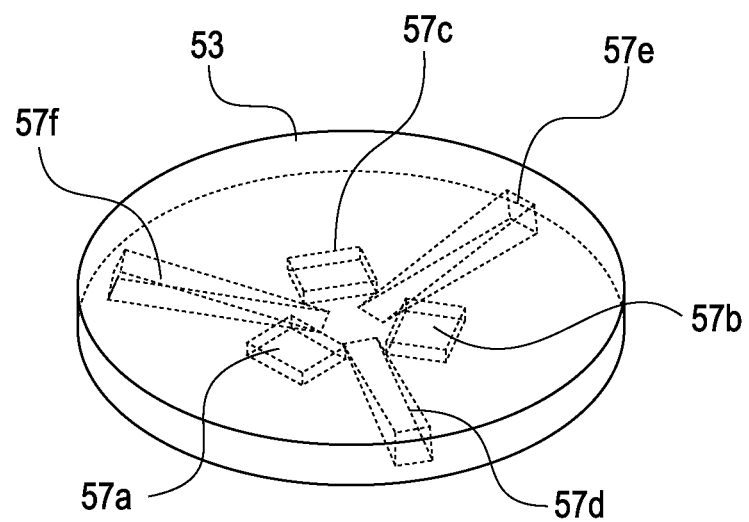
Figure 13G:
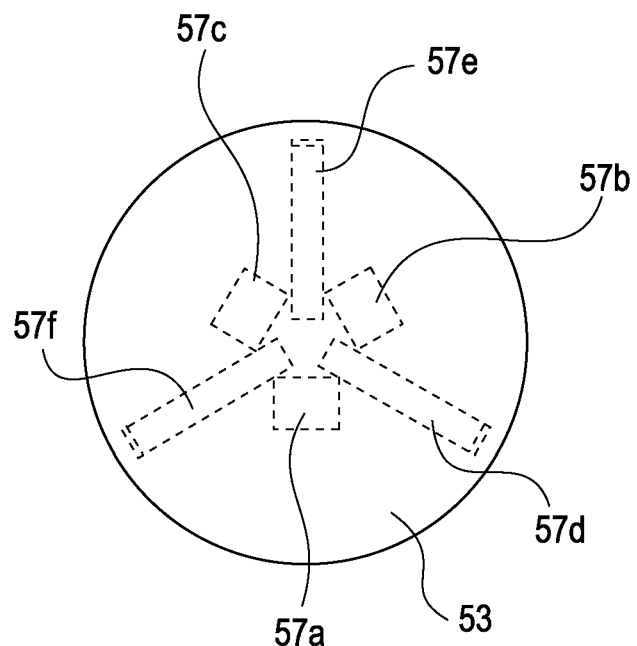
Figure 13H:
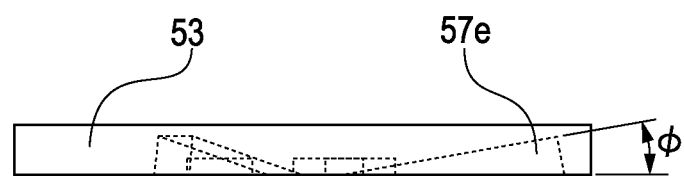

FIG. 13C is a schematic perspective view of FIG. 13A from which the action unit 53 including reflective diffraction grating 57a to 57f and the side base portion 52b are removed. FIG. 13D is a schematic plan view of FIG. 13C. FIG. 13E is a schematic right side view of FIG. 13C. FIG. 13F is a schematic perspective view of the action unit 53 including the reflective diffraction gratings 57a to 57f. FIG. 13G is a schematic plan view of FIG. 13F. FIG. 13H is a schematic right side view of FIG. 13F.

As illustrated in FIGS. 13A to 13F, the third embodiment of the present invention includes the light source 55 and six photodetector arrays 56a to 56f arranged around the light source 55. Among the six photodetector arrays 56a to 56f, the photodetector arrays 56a to 56c are disposed in the same plane as the emission surface of the light source. On the other hand, as illustrated in FIG. 13E, the photodetector arrays 56d to 56f are disposed in such a way that an angle φ between the photodetector arrays 56d to 56f and the emission surface of the light source 55 is in the range of 0 to 90 degrees and the barycenters D, E, and F of the photodetector arrays 56d to 56f are in the same plane as the emission surface including the origin O. As illustrated in FIG. 13F, the action unit 53 includes six reflective diffraction gratings 57a to 57f that are respectively parallel to the six photodetector arrays 56a to 56f disposed on the base unit 52.

The third embodiment illustrated in FIGS. 13A to 13H is an example. Each of the photodetector arrays 56a to 56f may include a light source. Three photodetector arrays 56d to 56f may be disposed on the emission surface at different angles to the emission surface.

A method of detecting a displacement of the action unit using the displacement sensor illustrated in FIGS. 13A to 13H will be described.

In FIG. 13C, an xyz orthogonal coordinate system having an origin at the emission point (barycenter) O of the light source 55 is used. The positions of the barycenters of the six photodetector arrays 56a, 56b, 56c, 56d, 56e, and 56f are respectively denoted by A, B, C, D, E, and F. A case when ∠AOB=θBOC=θCOA=120°, θDOE=θEOF=θFOD=120°, and OA=OB=OC=OD=OE=OF=r will be considered. Displacements detected by the photodetector arrays 56a, 56b, 56c, 56d, 56e, and 56f are respectively denoted by $s_a$, $s_b$, $s_c$, $s_d$, $s_e$, and $s_f$. Displacements of the action unit along the x, y, and z axes are respectively denoted by Δx, Δy, and Δz, and rotation angles around the x, y, and z axes centered at the origin are denoted by $θ_x$, $θ_y$, and $θ_z$.

Δx, Δy, and $θ_z$ are represented by the following equations using the displacements $s_a$, $s_b$, and $s_c$, which are detected in the xy plane and respectively obtained from the three photodetector arrays 56a, 56b, and 56c.

$$\Delta x = \frac{1}{3}\left(s_a - \frac{s_b}{2} - \frac{s_c}{2}\right) \tag{18}$$

$$\Delta y = \frac{\sqrt{3}}{4}(s_b - s_c) \tag{19}$$

$$\theta_z = \frac{1}{3 \cdot r}(s_a + s_b + s_c) \tag{20}$$

Let $δz_d$, $δz_e$, and $δz_f$ denote the displacements along the z axis at the positions D, E, and F. Then, the relationship between $δz_d$, $δz_e$, and $δz_f$ and the displacements $s_d$, $s_e$, and $s_f$ that are obtained from the three photodetector arrays 56d, 56e, and 56f is represented by the following equation.

$$\begin{pmatrix} \delta z_d \\ \delta z_e \\ \delta z_f \end{pmatrix} = \frac{1}{\sin\phi} \begin{pmatrix} s_d \\ s_e \\ s_f \end{pmatrix} \tag{21}$$

Therefore, Δz, $θ_x$, and $θ_y$ are represented by the following equations, using the displacement $s_d$, $s_e$, and $s_f$ obtained from the photodetector arrays 56d, 56e, and 56f.

$$\Delta z = \frac{1}{3 \cdot \sin\phi}(s_d + s_e + s_f) \tag{22}$$

$$\theta_x = \tan^{-1}\left\{\frac{s_e - \frac{1}{2}(s_d + s_f)}{\frac{3}{2} \cdot r \cdot \sin\phi}\right\} \tag{23}$$

$$\theta_y = \tan^{-1}\left(\frac{s_f - s_d}{\sqrt{3} \cdot r \cdot \sin\phi}\right) \tag{24}$$

Thus, with the third embodiment, the external force and the moment are calculated from the displacements parallel to the photodetector arrays, whereby substantially the same level of detection sensitivities can be obtained for the six axes. By using a three-dimensional mount technology, the size of the force sensor can be further reduced and the alignment can be further facilitated. The external force and the moment are calculated from the displacements output from the photodetector arrays in a similar manner as the first embodiment.

As with the force sensor of the first embodiment, the force sensor of the third embodiment has advantages over that of Japanese Patent Laid-Open No. 10-274573, No. 2005-241353, and No. 2005-98964.

Heretofore, force sensors according to the embodiments of the present invention have been described. However, the present invention is not limited to the embodiments, and can be modified within the spirit and scope thereof.

For example, in the embodiments described above, the number of the light sources is smaller than the number of the photodetector arrays and one light source corresponds to a plurality of displacement sensors, so that the size of the force sensor can be reduced. However, each of the displacement sensors may have one light source.

For example, in the embodiments described above, three or six photodetector arrays are provided. However, the number of photodetector arrays may be appropriately changed in accordance with the number of axes of detection.

For example, in the embodiments described above, the photodetector arrays and the diffraction gratings are arranged so as to be rotationally symmetric around the center of the force sensor in the xy plane with respect to a rotation angle of 120 degrees. However, the arrangement of the photodetector arrays and the diffraction gratings is not limited thereto. In the first and third embodiments, it is sufficient that the arrangement directions of the photodetector arrays be different from each other. The same applies to the grating directions of the diffraction gratings. In the second embodiment, it is sufficient that the two photodetector arrays and one light source be disposed in three planes that are not parallel to each other.

For example, in the embodiments described above, the light source is disposed on the base unit, and the diffraction gratings are disposed on the action unit. However, the diffraction gratings may be disposed on the base unit, and the light source may be disposed on the action unit. That is, it is sufficient that the light source be disposed on one of the base unit and the action unit and the diffraction gratings be disposed on the other of the base unit and the action unit. When the diffraction grating is disposed on the action unit, the light source might be disposed on the action unit by using a mirror which is disposed on the base unit. Light reflected by the mirror may irradiate the diffraction gratings. When the diffraction grating is disposed on the base unit, the light source might be disposed on the base unit by using a mirror which is disposed on the action unit. Light reflected by the mirror may irradiate the diffraction gratings. The photodetector arrays may be disposed on the base unit or on the action unit together with the light source. If, for example, the diffraction gratings are transmission gratings, the photodetector arrays may be disposed on a member other than the base unit and the action unit.

For example, in the embodiments described above, the diffraction gratings and the photodetector arrays face each other in parallel. However, the diffraction gratings and the photodetector arrays may not face each other in parallel, if a prism or a reflector for bending a light beam is used. For example, while disposing a plurality of photodetector arrays in the same plane (xy plane) as with the first embodiment, the grating directions of some of the diffraction gratings may be aligned with the direction perpendicular to the plane (z axis direction) so as to detect the displacement in the z axis direction using the same principle as the optical encoder.

For example, the diffraction gratings may be integrally formed with the base unit or the action unit using a resin molding technique, or may be attached to the base unit or the action unit as an independent member.

For example, in the embodiments described above, an elastic member having a spring-shaped structure or an elastic member made of rubber or the like is used as the elastic supporting unit. However, the structure of the elastic supporting unit may be appropriately selected in accordance with mechanical properties required for the elastic supporting unit. In the second and third embodiments, a one-piece elastic supporting unit surrounds the light source, the photodetector arrays, and the diffraction gratings. Moreover, the light source, the photodetector arrays, and the diffraction gratings are enclosed with the base unit, the action unit, and the elastic supporting unit. Thus, the enclosed members are protected from the external environment. In this case, because it is not necessary to form an independent protective member on the light source and the photodetector arrays, influence of ghost light reflected from an interface of the protective member can be avoided.

Figure 14:
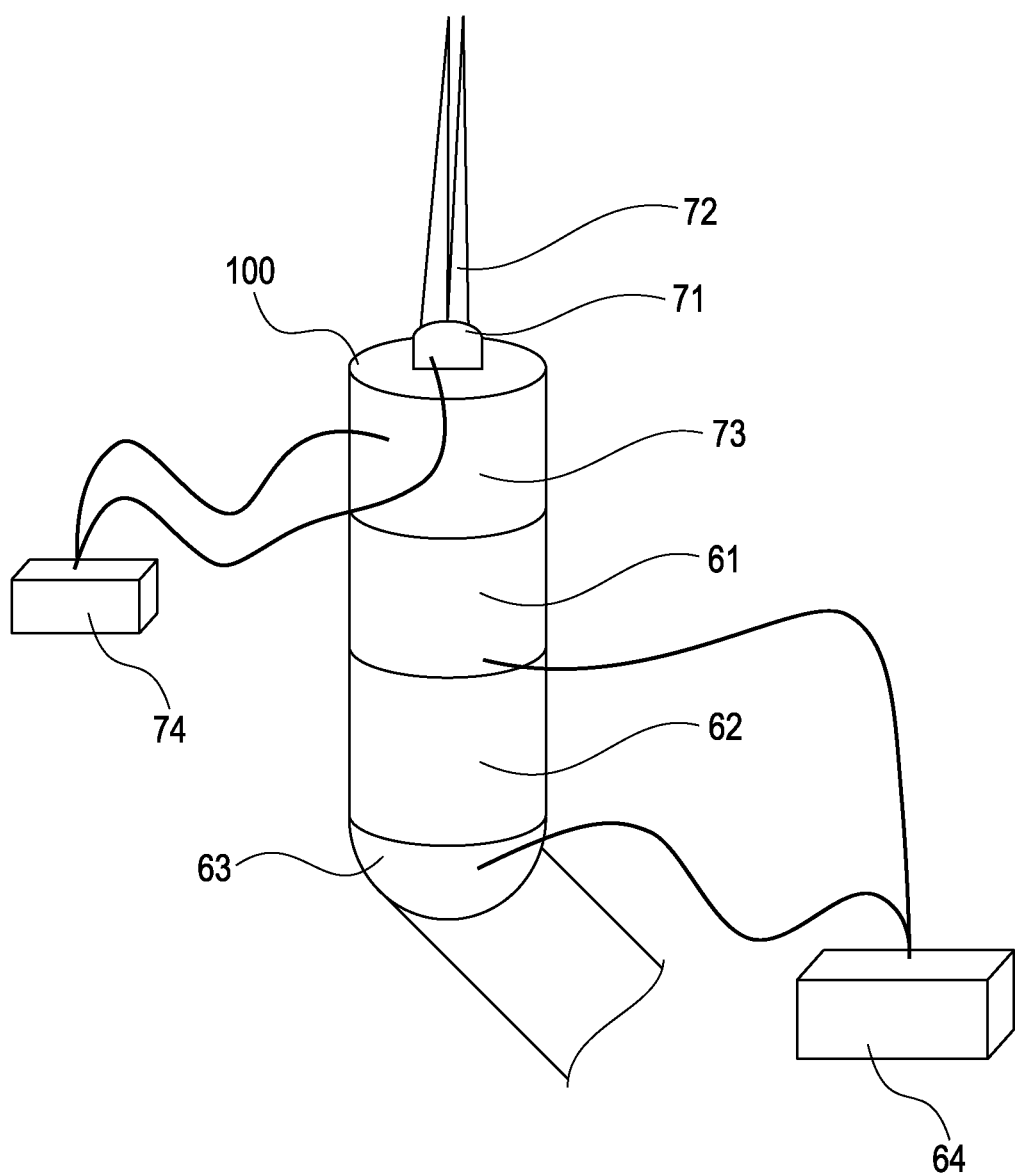
FIG. 14 is a schematic view of a tweezer-shaped hand of an industrial robot.

The present invention provides an industrial robot including the force sensor described above. As illustrated in FIG. 14, an industrial robot 100 includes a force sensor 61, a robot arm (driven unit) 62, a drive unit 63 that drives the driven unit 62, and a control unit 64 that controls driving of the drive unit 63 on the basis of at least one of an external force and a moment detected by the force sensor 61. The force sensor 61 detects a force and a moment acting on the entire robot arm 62. As illustrated in FIG. 14, the industrial robot 100 may further include a tweezer-shaped hand 72 disposed at an end of the force sensor 61 (the action unit or the base unit), the tweezer-shaped hand 72 being capable of holding a small object, a drive unit 73 for driving the tweezer-shaped hand 72, a force sensor 71 that detects a force and a moment acting on the entire tweezer-shaped hand 72, and a control unit 74 that controls driving of the drive unit 33 on the basis of at least one of the external force and the moment detected by the force sensor 71. Using the force sensor having a high sensitivity and a high rigidity, the industrial robot according to the present invention can be driven with a higher precision and at a higher speed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-134187 filed Jun. 3, 2009, which is hereby incorporated by reference herein in its entirety.

What is claimed is:

1. A force sensor comprising:
   a base unit;
   an elastic supporting unit connected to the base unit;
   an action unit supported by the elastic supporting unit; and
   a detection unit that detects at least one of an external force acting on the action unit and a moment acting on the action unit,
   wherein the detection unit includes
      first, second and third light sources disposed on one of the base unit and the action unit,
      first, second and third diffraction gratings corresponding to the first, second and third light sources, respectively, and disposed on the other one of the base unit and the action unit,
      a first photodetector array including a plurality of photodetectors that receives an interference image formed by light that has been emitted from the first light source and diffracted by the first diffraction grating and obtains a plurality of signals having different phases,
      a second photodetector array including a plurality of photodetectors that receives an interference image formed by light that has been emitted from the second light source and diffracted by the second diffraction grating and obtains a plurality of signals having different phases,
      a third photodetector array including a plurality of photodetectors that receives an interference image formed by light that has been emitted from the third light source and diffracted by the third diffraction grating and obtains a plurality of signals having different phases, and
      a calculation unit that calculates a displacement of the action unit with respect to the base unit on the basis of the plurality of signals obtained from the first, second and third photodetector arrays and calculates at least one of the external force and the moment acting on the action unit on the basis of the displacement.

2. The force sensor according to claim 1,
   wherein the first, second and third diffraction gratings have different grating directions from one another.

3. The force sensor according to claim 2,
   wherein the number of light sources is smaller than the number of the photodetector arrays.

4. The force sensor according to claim 1,
   wherein for each of the first, second and third photodetector arrays, the calculation unit calculates the displacement of the action unit in a direction perpendicular to a plane in which the respective photodetector array is disposed on the basis of a change in an amount of light received by the respective photodetector array, the change being caused by a movement of the action unit in the perpendicular direction, and calculates the external force acting on the action unit in the perpendicular direction on the basis of the displacement in the perpendicular direction.

5. The force sensor according to claim 1,
   wherein for each of the first, second and third photodetector arrays, the calculation unit calculates the displacement of the action unit in a direction perpendicular to a plane in which the respective photodetector array is disposed on the basis of a change in a contrast of the respective interference image caused by a movement of the action unit in the perpendicular direction, and calculates the external force acting on the action unit in the perpendicular direction on the basis of the displacement in the perpendicular direction.

6. An industrial robot comprising:
a force sensor according to claim 1;
a driven unit disposed in the action unit;
a drive unit that drives the driven unit; and
a control unit that controls driving of the drive unit on the basis of at least one of an external force and a moment detected by the force sensor.

7. The force sensor according to claim 1, wherein for each of the first, second and third photodetector arrays, the respective interference image is formed by three light beams different in order from one another emitted from the respective diffracting grating.

8. A force sensor comprising:
a base unit;
an elastic supporting unit connected to the base unit;
an action unit supported by the elastic supporting unit; and
a detection unit that detects at least one of an external force acting on the action unit and a moment acting on the action unit,
wherein the detection unit includes
 a light source disposed on one of the base unit and the action unit,
 a diffraction grating disposed on the other one of the base unit and the action unit, the diffraction grating outputs plural diffracted beams whose orders are different from each other based on a beam emitted from the light source,
 a photodetector array that receives an interference image generated by an interference of the plural diffracted beams emitted from the diffraction grating and outputs a plurality of signals whose phases are different from each other, and
 a calculation unit that calculates a displacement of the action unit with respect to the base unit on the basis of the plurality of signals and calculates at least one of the external force and the moment acting on the action unit on the basis of the displacement.

9. An industrial comprising:
a force sensor according to claim 8;
a driven unit disposed in the action unit;
a drive unit that drives the driven unit; and
a control unit that controls driving of the drive unit on the basis of at least one of an external force and a moment detected by the force sensor.

* * * * *